(12) United States Patent
Gabrys

(10) Patent No.: US 6,664,680 B1
(45) Date of Patent: Dec. 16, 2003

(54) FLYWHEEL DEVICE WITH ACTIVE MAGNETIC BEARINGS

(75) Inventor: Christopher W. Gabrys, Reno, NV (US)

(73) Assignee: Indigo Energy, Inc., Napa, CA (US)

( * ) Notice: Subject to any disclaimer, the term of this patent is extended or adjusted under 35 U.S.C. 154(b) by 0 days.

(21) Appl. No.: 10/026,568

(22) Filed: Dec. 20, 2001

Related U.S. Application Data (60) Provisional application No. 60/257,938, filed on Dec. 20, 2000.

(51) Int. Cl.[7] .............................. H02K 7/09; H02K 7/02
(52) U.S. Cl. ........................... 310/74; 74/572; 310/90.5
(58) Field of Search ..................... 310/74, 90.5; 74/572

(56) References Cited

U.S. PATENT DOCUMENTS

| | | | | |
|---|---|---|---|---|
| 4,353,602 | A | * 10/1982 | Habermann | 310/90.5 |
| 4,444,444 | A | * 4/1984 | Benedetti et al. | 310/90.5 |
| 5,111,102 | A | 5/1992 | Meeks | 310/90.5 |
| 5,315,197 | A | 5/1994 | Meeks et al. | 310/90.5 |
| 5,514,924 | A | 5/1996 | McMullen et al. | 310/90.5 |
| 5,614,777 | A | 3/1997 | Bitterly et al. | 310/74 |
| 5,708,312 | A | 1/1998 | Rosen et al. | 310/90 |
| 5,932,935 | A | 8/1999 | Clifton et al. | 310/74 |
| 6,267,876 | B1 | 7/2001 | Allaire et al. | 310/68 B |

FOREIGN PATENT DOCUMENTS

| | | | | |
|---|---|---|---|---|
| JP | 9-308185 | * 11/1997 | | H02K/7/02 |
| JP | 10-225017 | * 8/1998 | | H02J/15/00 |
| WO | 98/43341 | * 10/1998 | | H02K/7/02 |

* cited by examiner

*Primary Examiner*—Burton Mullins
(74) *Attorney, Agent, or Firm*—J. Michael Neary (57) ABSTRACT

A flywheel energy storage system having magnetic bearings that are preferably homopolar, that is, the magnetic fields do not alternate polarity around a given circumferential location. This significantly increases efficiency, reduces heating in the evacuated flywheel environment and reduces power requirements of the electronics. The magnetic bearings are also preferably permanent magnet biased. Permanent magnets provide bias flux in the magnetic bearings which produces several benefits. The bias flux linearizes and amplifies the response of the magnetic bearings for much easier and simpler control. Compared with designs using electromagnetic bias, permanent magnet bias results in lower power consumption and increased linearity in force to displacement response due to the large reluctance offered by the permanent magnets. Permanent magnet bias also allows use of only one amplifier per axes instead of two. This greatly reduces the costs and increases reliability.

18 Claims, 6 Drawing Sheets

FLYWHEEL DEVICE WITH ACTIVE MAGNETIC BEARINGS

This is related to U.S. Provisional Application No. 60/257,938 filed on Dec. 20, 2000 and entitled Flywheel Energy Storage System with Magnetic Bearings".

This invention pertains to flywheel energy storage systems and more particularly to a stationary flywheel storage device that employs a five active axes magnetic bearing system to support a solid alloy steel flywheel for rotation about a vertical axis. The combination and attributes of the particular elements in the system allow for simpler operation, reduced costs and increased life and reliability.

BACKGROUND OF THE INVENTION

Flywheels have been used for many years as energy storage devices. They have often been used as power smoothing mechanisms for internal combustion engines and other kinds of power equipment. More recently, flywheels have been recognized as a very attractive energy storage technology for such electrical applications as uninterruptible power supplies, utility load leveling systems and electric vehicles.

Modern flywheel energy storage systems convert back and forth between the rotational inertia of a spinning flywheel and electrical energy. A flywheel energy storage system includes a flywheel, a motor generator, a bearing system and a vacuum enclosure. The rotating flywheel stores mechanical energy, the motor generator converts between electrical energy and mechanical energy and the bearing system physically supports the rotating flywheel.

In almost all energy storage applications, whether quick discharge type (power ride-through), where discharge time is measured in seconds, or long-term discharge type (power backup), where discharge time is measured in hours, flywheels directly compete with electrochemical batteries. Key advantages of flywheels used for electrical energy storage over electrochemical battery systems are its longevity and reliability, and its lower life cycle cost. Electrochemical batteries, in particular, lead-acid batteries, have short lifetimes, between six months and seven years depending on operating conditions. These batteries require periodic maintenance and can fail unpredictably. In contrast, flywheel energy storage systems are expected to have maintenance-free lifetimes of twenty years.

Magnetic bearings have been used in some flywheel systems for support of the flywheel. They offer the advantages of low friction, no wear, and potential for extremely long life at high operational speeds. One type of magnetic bearing system uses five actively controlled axes to support a rotor. Five active axes magnetic bearings use electromagnets, position feedback and electronic control to provide levitation. Use of such systems is growing in many applications because they allow support and smooth rotation of dynamically complex rotor systems. They also typically can provide much higher radial stiffnesses and carry heavier loads than much simpler passive radial magnetic bearings. They also do not require the large amount of relatively expensive magnets required by passive radial magnetic bearings.

Flywheel systems must operate continuously at high speed for long periods of time. Although magnetic bearings do not encounter wear like mechanical bearings, five active axes magnetic bearing systems require constant high frequency power switching to actively control the radial magnetic bearings. This switching limits the life of the electronics, which eventually fail. To date, some flywheel systems have been built using five active axes magnetic bearings. Unfortunately, these flywheel systems have been extremely complex, costly and have limited reliability. For these reasons, flywheel systems employing this type of bearing are not believed to be commercially available or feasible.

SUMMARY OF THE INVENTION

Accordingly, the invention is a stationary flywheel storage device that employs a five active axes magnetic bearing system. The flywheel system is specifically designed to promote longer life, simpler operation, higher reliability and less costly active magnetic bearing support. The flywheel system is intended for use in stationary applications where it is not subjected to the dynamic loads of mobile applications and as such the loads on the magnetic bearings are greatly reduced. The load capacity of the magnetic bearings directly affects the cost of the actuators and amplifier electronics. The actual level of carried loads also reduces the life of the electronics by requiring switching of higher currents. It is therefore a goal of the invention to reduce the loads to the radial magnetic bearings as much as possible for the benefits of both reducing the costs and increasing the life of the electronics.

The loads to the radial magnetic bearings are further reduced by employing rotation about a vertical axis. This is typically required when passive radial magnetic bearings are employed but not necessarily a requirement when active radial magnetic bearings are used. The five active axis magnetic bearing system uses an upper radial magnetic bearing a lower radial magnetic bearing and at least one axial thrust magnetic bearing. The lower the tilt angle from vertical, the lower the radial loads that must be carried and hence the lower the currents that must be switched to provide support. In one embodiment of the invention, the tilt angle from vertical is preferably maintained less than 10 degrees. The radial load capacity of the radial magnetic bearings can be significantly reduced to reduce the cost of the actuators and control amplifiers. The radial magnetic bearings in the assembled flywheel system preferably have load capacities within a range corresponding to a tilt angle between 2 degrees and 10 degrees. Below 2 degrees, installation accuracy becomes more difficult and above 10 degrees, the magnet bearings become more expensive.

Unlike previous flywheel systems designed for employing five active axes magnetic bearing systems. The devices according to this invention does not use a composite flywheel. Composite material filament wound flywheels can operate at very high tip speeds for storing large amounts of energy per weight. They are constructed in the form of predominantly hoop wound rims. The rim is then typically connected to a central shaft through the use of a hub that is sufficiently flexible to match the large inner diameter strain of the rim. This construction typically results in flexural resonance modes in the flywheel below the maximum normal operating speed. Five active axes magnetic bearing systems are especially well suited to support these flywheels because the electronic control algorithms can be made to change the stiffnesses and damping in the bearings during operation to provide smooth rotation. Unfortunately, this makes the magnetic bearing control much more complex and it is the belief of this inventor that it is inherently less reliable. If the properties of the flywheel or the electronics change and degrade slightly over the continuous operating life, the magnetic bearings would fail to operate properly. The invention overcomes these problems by employing a steel flywheel having a solid center. The flywheel is preferably constructed from alloy steel and is thus capable of operation above 200 m/sec for storing appreciable energy. The solid center construction serves two purposes: it reduces the hoop direction stresses in the flywheel by 50%, and it also provides a flywheel that is rigidly constructed. In a further aspect of the invention, the flywheel preferably has no flexural resonances below the normal operating speed. The magnetic bearing control can therefore be made much simpler and more reliable. Speed independent control can be used to control the magnetic bearings.

The use of a solid steel flywheel can create some difficulties in the design of the magnetic, bearing system. In composite material flywheels, the stress is maximum in the hoop wound rim and the shaft in the center of the flywheel typically operates at a very low stress level. In a solid steel flywheel, the hoop and radial stresses are maximum in the radial center. When operating at high speeds, these stresses are very large. The result of these stresses is that the length of the flywheel in its radial center will shrink due to Poisson's ratio contraction. Therefore, the distance between the rotor portions of the upper radial magnetic bearing and the lower radial will shrink. The coupling between the rotor and stator portions of the radial magnetic bearings and bearing properties will change as the speed increases. The amount of contraction is a function of the axial length of the flywheel and also the operating stresses, which are a function of the tip speed. In one embodiment of the invention, the radial magnetic bearings are preferably designed to change the operative axial length by only 5% when rotated to high speed. If the axial position of the flywheel is fixed on the end containing the active axial magnetic bearing or axial position sensor, only the radial magnetic bearing at the opposite end will be affected by the flywheel length change. The radial magnetic bearing on the end of the flywheel opposite the end with the active axial magnetic bearing is therefore designed to have a minimum operative axial length that depends on the axial length of the flywheel and the operating tip speed. Satisfying this requirement also helps the flywheel system overcome any dimensional changes for thermal expansions or contractions.

The magnetic bearing system comprises at least 5 amplifiers with one for each of the five controlled axes and at least one controller. Because the flywheel system is intended to provide power when power is not available, the magnetic bearing system must also derive its own power from the flywheel system. The controller and five amplifiers are preferably powered by one or more DC-DC converters that are connected to the direct current side of a synchronous inverter that drives the motor/generator of the flywheel system. The converters provide constant power regardless of the slowing speed of the flywheel during a discharge.

In all embodiments of the invention, the magnetic bearings are preferably homopolar in that the magnetic fields do not alternate polarity around a given circumferential location. This significantly increases efficiency, reduces heating in the evacuated flywheel environment and reduces power requirements of the electronics. The magnetic bearings are also preferably permanent magnet biased. Permanent magnets provide bias flux in the magnetic bearings which produces several benefits. The bias flux linearizes and amplifies the response of the magnetic bearings for much easier and simpler control. Compared with designs using electromagnetic bias, permanent magnet bias results in lower-power consumption and increased linearity in force to displacement response due to the large reluctance offered by the permanent magnets. Permanent magnet bias also allows use of only one amplifier per axes instead of two. This greatly reduces the costs and increases reliability.

DESCRIPTION OF THE DRAWINGS

The invention and its many attendant features and advantages will become better understood upon reading the following detailed description of the preferred embodiments in conjunction with the drawings, wherein.

DESCRIPTION OF THE PREFERRED EMBODIMENTS

Figure 1A:
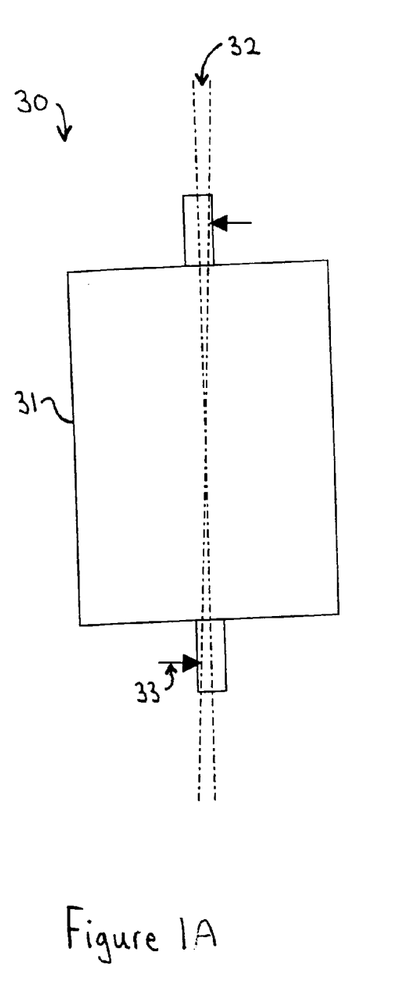
FIGS. 1A and 1B are a schematic drawings of a flywheel supported for rotation about a vertical axis showing tilt angle effects on radial magnetic bearing loads.
Figure 1B:
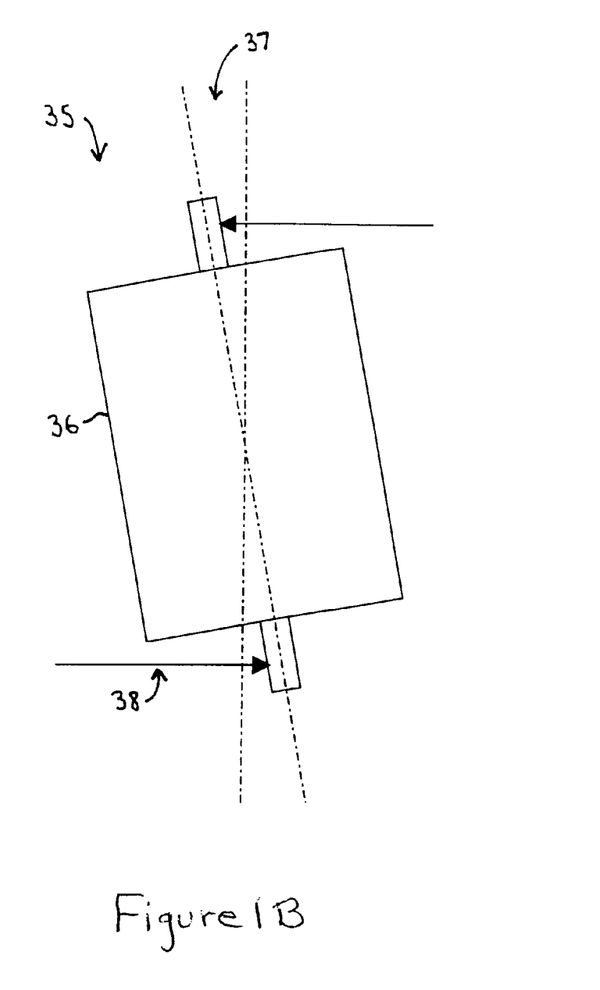

Turning to the drawings wherein like characters designate identical or corresponding parts, and more particularly to FIGS. 1A and 1B thereof, the tilt angle effects are shown on radial magnetic bearing loads in a flywheel for rotation about a vertical axis. The tilt angle of a flywheel system significantly affects the radial loads that must be carried by the active radial magnetic bearings. Axial magnetic bearing loads are easier to support because they are perpendicular to dynamic radial loads from rotation. The control of axial magnetic bearings therefore does not require the same high frequency control. As radial loads increase, the costs of both the actuators and the amplifiers to drive them also increase, and amplifier lives become shorter because of switching higher currents to provide support. Magnetic bearings in accordance with the invention preferably support the flywheel for rotation in stationary applications about a substantially vertical axis.

A flywheel system 30 with a flywheel 31, shown in FIG. 1A, has a tilt angle 32 from vertical of 2 degrees. A requirement of a flywheel installation with an accuracy for tilt angles less than 2 degrees becomes more difficult. The radial bearing loads 33 are relatively small for even heavy flywheels. For a 300 pound flywheel, the radial loads with a 2 degree tilt would be only slightly over 5 pounds. Increasing the tilt angle, increases the radial loads. A flywheel system 35 having a flywheel 36, shown in FIG. 1B, has a tilt angle 37 from vertical of 10 degrees. At this point, the radial loads 38 are substantially increased. For a 300 pound flywheel with a 10 degree tilt angle, the radial loads are over 25 pounds, resulting in a five fold increase. These may be relatively light loads for active magnetic bearings, however the goals of the invention are reduced costs and maximizing life and reliability. Heavy flywheels would also have linearly higher radial loads. The costs of the radial magnetic bearings can be limited by limiting the load capacity required by minimizing the installation tilt angle to the smallest angle that can be economically specified, that is, that an installation crew can accomplish without excessive cost.

The coupling of multiple magnetic bearings to form the complete magnetic bearing system as well as negative magnetic stiffnesses that can be generated by the motor/generator of the flywheel system can reduce the radial load capacity of an individual magnetic bearing when installed in the system. The radial load capacities are preferably considered in the complete system and at zero rotational speed. In one embodiment of the invention the maximum tilt angle capacity is bounded between 2 degrees and 10 degrees. The radial load capacities of the upper and lower radial active magnetic bearings, R measured in Newtons is preferably governed by the equation:

$$0.170M < R < 0.838M$$

where M is the mass of the flywheel measured in kilograms.

It is the belief of this inventor that simplicity in the control of the flywheel magnetic bearing system will increase the reliability and longevity of a flywheel storage device. The flywheel is preferably constructed of solid alloy steel. The solid construction, without center through hole, reduces the hoop direction stresses by 50%. The flywheel is preferably constructed from alloy steel, such as 4340, and is thus capable of operating at tip speeds greater than 200 meters per second. Other types of alloy steel could alternatively be used.

Typically flywheel storage devices that have been developed employing five active axes magnetic bearing systems have been designed for use with composite material flywheels. Composite flywheels can operate at much higher speeds and store more energy per weight than steel flywheels. They are also more expensive and hence have matched the higher expense of employing five active axes magnetic bearings. Such systems are usually designed for mobile applications where the light weight composite can help reduce the bearing loads. Composite flywheels usually are constructed from a hoop wound rim of carbon fiber or glass fiber in an epoxy matrix. A hub with high strain capability is used to connect a high elongation rim to a central shaft for journaling. The flexible hub and multiple piece connections can give rise to flexural vibration modes in the operating speed range of the flywheel. Control of such modes is achievable by five active axes magnetic bearing systems because they can be designed to change stiffnesses and damping during operation to provide smooth operation. Unfortunately, the flywheel systems employing five active axes magnetic bearings to date have been very complex, costly and unreliable. For example, axial magnetic bearings for such composite flywheels cannot use the flywheel rim as an integral element of the magnetic bearing since the composite material of the rotor is not magnetic material. It is believed by this inventor that these deficiencies are the reasons why flywheel systems employing five active axes magnetic bearings are not known to be commercially available. There is also of concern about the longevity of prior complete flywheel systems. As the system operates continuously for long periods of time, changes in the properties of the flywheel or bearing electronics could result in failure of the very complex control.

Figure 2:
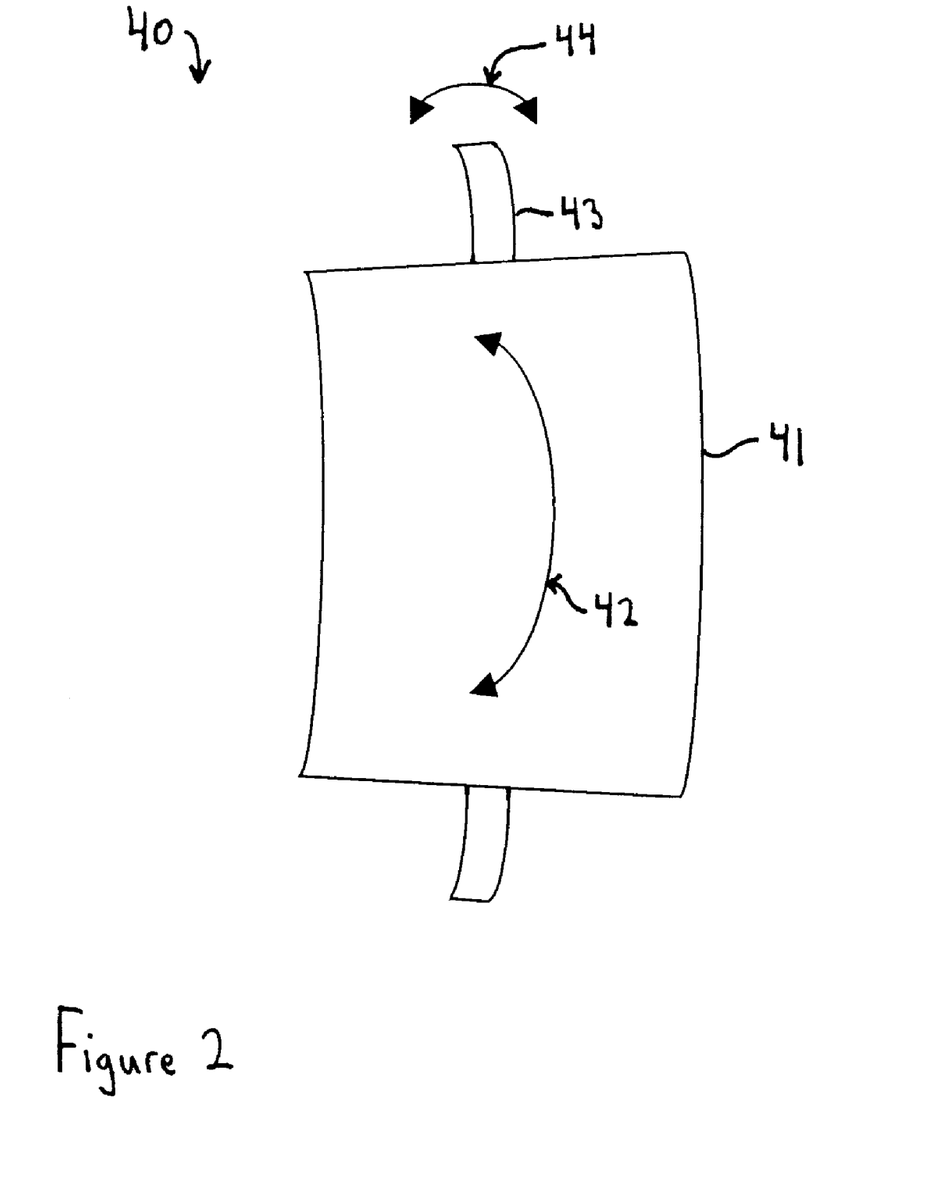
FIG. 2 is a schematic drawing of a solid alloy steel flywheel showing flexural resonances, greatly exaggerated for clarity of illustration.

The invention combines a very high technology magnetic bearing system with a lower technology type flywheel. The advantages of this unconventional combination are increased reliability, reduced complexity and costs in the magnetic bearing system. The solid steel construction provides a slower flywheel but one that is more rigid. Because the flywheel system is intended for stationary applications, dynamic loading from external forces that would be experienced in mobile applications with the much heavier flywheel is not an issue. In one embodiment of the invention, the flywheel preferably has no flexural resonances below the normal operating speed. More preferably, any flexural resonances are at speeds that are substantially higher than the operating speed. An illustration in FIG. 2 of flexural resonances in a solid steel cylindrical flywheel 41 and shafts 43 for journaling. Resonances that can occur include body resonances 42 or shaft resonances 44. Making the flywheel 41 and shafts 43 of sufficient diameter and stiffness for their lengths increases the resonant frequencies. Control of the magnetic bearings for smooth operation can be made much simpler without changing control properties. The magnetic bearing control can therefore be accomplished independent of speed.

Figure 3:
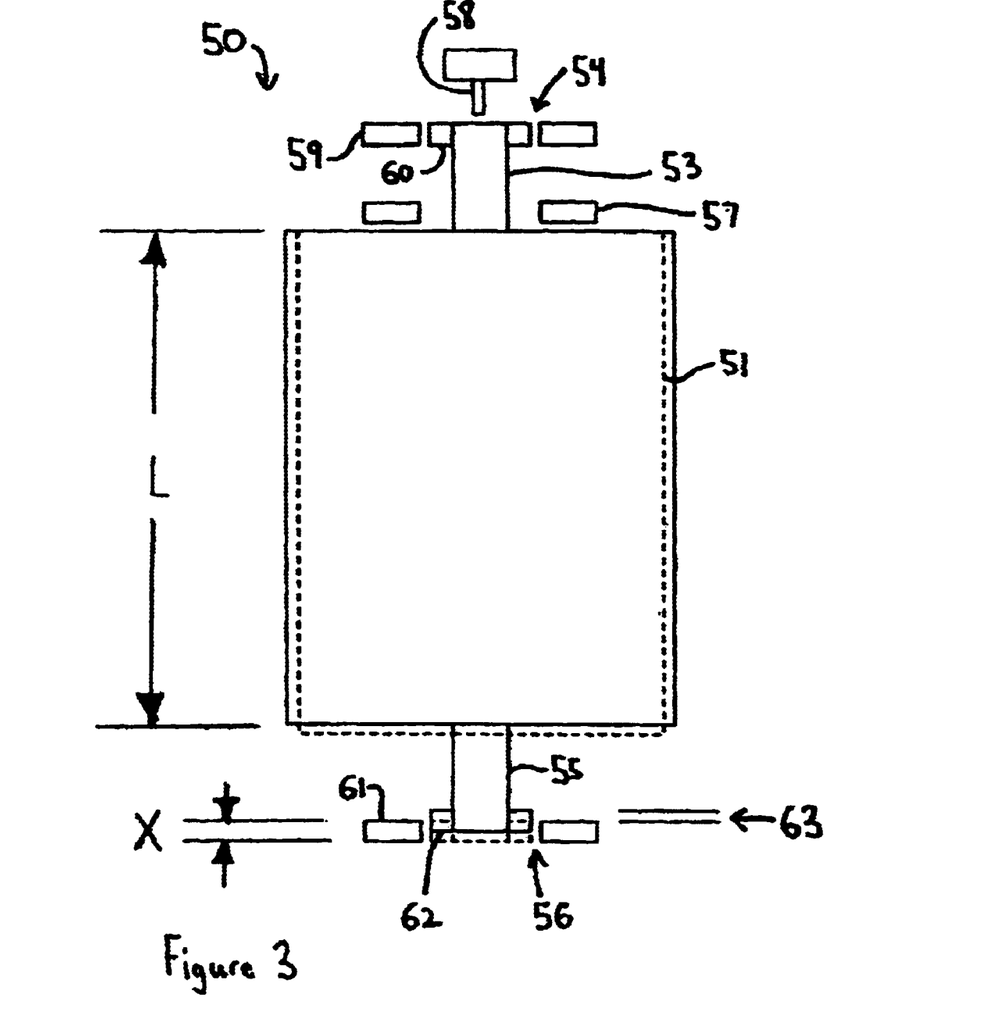
FIG. 3 is a schematic drawing of a solid alloy steel flywheel showing Poisson Ratio and thermal contraction effects.

Because the flywheel system employs a solid steel flywheel, the stresses in the flywheel are maximum in the radial center. This is very different than composite flywheels that use a filament wound rim whereby the maximum stresses occur in the rim with the center shaft having very little stress. The high stress in the center results in Poisson contraction of the length of the flywheel in the center. The magnetic bearings must therefore account for an axial change in length between the bearing rotor portions. A flywheel system 50 with solid alloy steel flywheel showing Poisson Ratio and thermal contraction effect, shown in FIG. 3, is comprised of a flywheel 51 shown at rest in broken lines and shown at high operating speed in solid lines. The flywheel 51 has an upper shaft 53 with an upper active radial magnetic bearing 54 and a lower shaft 55 with lower radial magnetic bearing 56. An active axial magnetic bearing 57 interacts directly with the top axial surface of the solid steel flywheel 51 to carry the weight of the flywheel 51, and is controlled by an axial position sensor 58 operating on the end of the upper shaft 53.

The upper active radial magnetic bearing 54 has a rotor portion 60 attached to the upper shaft 53 and a surrounding stator portion 59. Likewise, the lower magnetic bearing 56 has a rotor portion 62 attached to the lower shaft 55 and a surrounding stator portion 61. Radial position sensors, not shown, are preferably embedded in the upper and lower active radial magnetic bearing stators 59, 61. As the flywheel 51 is accelerated, it grows in diameter and shrinks in length from its shape while at rest. Because the axial magnetic bearing control is provided on the upper end of the flywheel 51, the upper active radial magnetic bearing 54 and the position sensor 58 are unaffected by changes in the length of the flywheel 52 from rotation. However, the lower radial magnetic bearing 56 encounters a change in the magnetic coupling between the rotor portion 62 and stator portion 61. The rotor portion 62 slides a distance 63 out of the stator portion 61, thereby reducing the coupling. This can reduce the stiffness and damping of the lower radial magnetic bearing 56. The axial magnetic bearing control 58 could alternately be provided on the lower end and hence the upper radial magnetic bearing 54 would be the one affected. It is preferable to reduce the effects and losses of performance by having a sufficient axial operative length in the magnetic bearing 56. In one embodiment of the invention, the loss in the axial length coupling the rotor portion and stator portion of the affected radial magnetic bearing is preferably limited to only 5%. The change in flywheel length is proportional to the flywheel length and also the operating stress, which is a function of the tip speed. To limit the loss of magnetic coupling length to only 5%, the operative axial length of the radial magnetic bearing, X in meters, flywheel length, L in meters, and operating tip speed, V in meters per second should be as follows:

$$X \geq 9.25 \cdot 10^{-8} \, V^2 \, L$$

Figure 4:
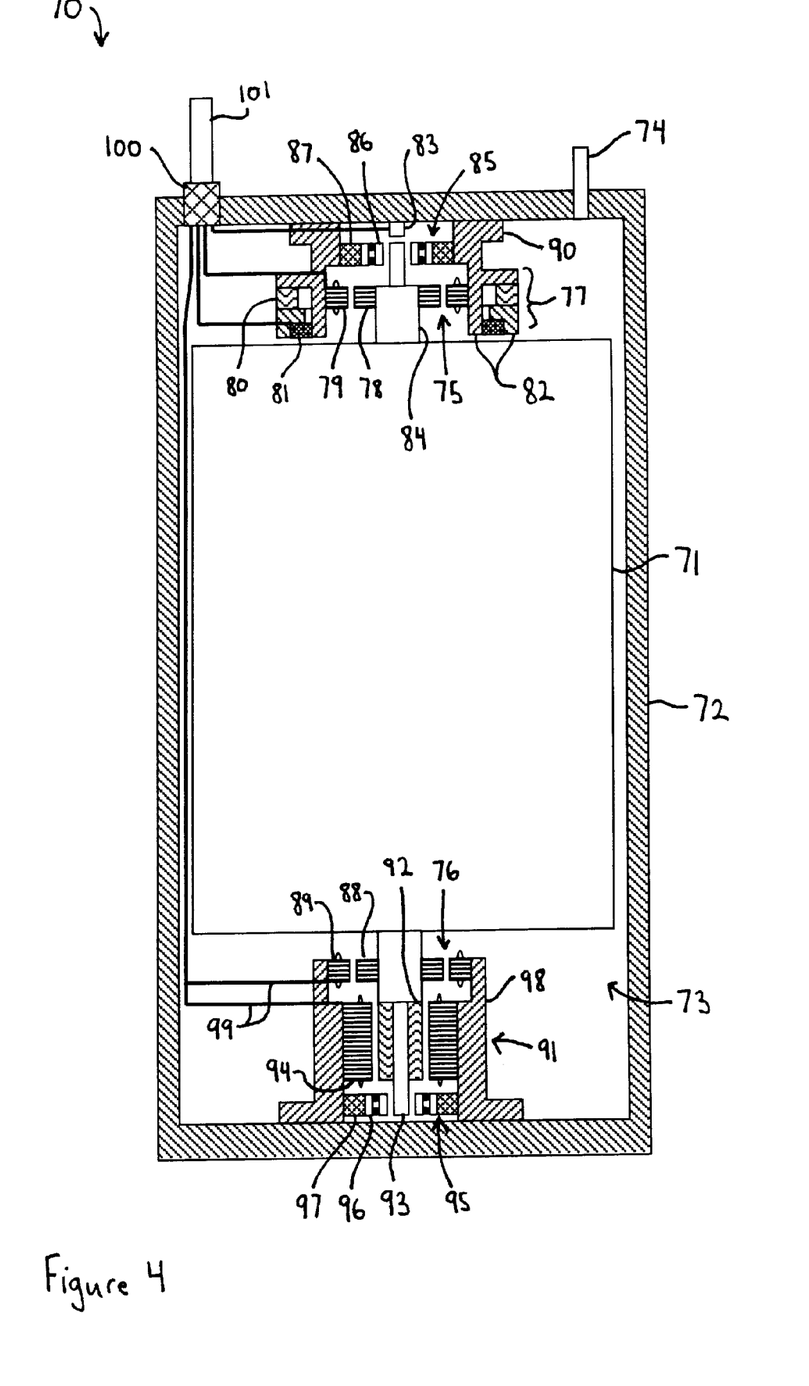
FIG. 4 is a schematic drawing of a flywheel energy storage device with five active axes magnetic bearing system in accordance with the invention.

A flywheel energy storage device with five active axes magnetic bearing system in accordance with the invention is shown in FIG. 4. The flywheel system 70 is comprised of a solid alloy steel flywheel 71 inside an evacuated chamber 73 within a container 72. A vacuum port 74 can be used for establishing or maintaining the vacuum 73. The flywheel 71 is supported for rotation by an upper active radial magnetic bearing 75, a lower active radial magnetic bearing 76 and an upper active axial magnetic bearing 77. The magnetic bearings 75, 76, 77 are preferably homopolar for allowing the highest efficiency. This reduces any heating that would occur in the vacuum 73 and power requirements by the control electronics, not shown, typically outside the container 72. The magnetic bearings 75, 76, 77 also preferably use permanent magnet bias. Permanent magnetic bias linearizes and amplifies the forces from the applied control currents. Compared to electromagnetic biased magnetic bearings, permanent magnet bias further reduces power consumption per force generation, produces more linear force to displacement response and also reduces the number of required amplifier to only one per axis. All of these factors significantly reduce the costs and increase both the reliability and longevity of the magnetic bearing system. Such homopolar permanent magnet biased active magnetic bearings can be purchased from Calnetix also known as Innovative Magnetic Technologies.

Because the flywheel spins about a vertical axis and the radial magnetic bearings are not required to carry much weight in combination with using homopolar radial magnetic bearings, variations in the magnetic field around the rotor portion of the radial magnetic bearings are minimized. The radial magnetic bearing rotor portions and or stator portions are not necessarily required to have laminated construction. It is possible that the magnetic bearings can act directly on the flywheel shafts. Likewise, if the flywheel is designed not to have any flexural vibration modes to be damped the required response speed capability can be slower. The use of permanent magnet bias in the magnetic bearings helps linearize the force to deflection response, which can reduce the required electronic switching speed for levitation or at least reduce the need for laminated construction. These factors can reduce costs and greatly extend the operating life of the magnetic bearing system.

The upper radial magnetic bearing 75 is comprised of a rotor portion 78 and a surrounding stator portion 79 that provides control forces. The rotor portion 78 is attached to the upper shaft 84. The active axial magnetic bearing 77 like the radial magnetic bearings 75, 76 can have several constructions. In this configuration flywheel system, the axial magnetic bearing 77 acts on the upper face of the flywheel 71 to provide the lifting force. The axial magnetic bearing 77 is comprised of a permanent magnet 80 to create a bias flux and an annular coil 81 to provide a control flux. Two poles 82 direct flux to the flywheel 71 to provide lift. An axial position sensor 83 controls the axial position. The radial magnetic bearings 75, 76 preferably have position sensors, not shown, embedded within. The active axial magnetic bearing can be a combined with an active radial magnetic bearing in a combination bearing and still be in accordance with the invention.

In one embodiment of the invention, the magnetic bearings 75, 76, 77 can be controlled by using self sensing in which separate position sensors are not required, although such self-sensing is best used without permanent magnet bias. The simpler dynamic operation of the flywheel 71 facilitates easier implementation of self sensing control. The lower radial magnetic bearing 76 is also comprised of a rotor portion 88 and a surrounding stator portion 89 that generates the forces. The rotor portion is attached to the lower shaft 93. In the event of an overload of the magnetic bearings 75, 76, 77 or when not operating, the flywheel 71 is supported on upper and lower auxiliary bearings 85 and 95. The auxiliary bearings 85, 95 consist of ball bearing sets 86, 96 mounted to stator structures 90, 98 through use of bearing mounts 87, 97. The flywheel 71 is accelerated and decelerated using an attached motor/generator 91. The motor/generator is 91 preferably a synchronous brushless type for long life and high efficiency. It is can be a permanent magnet design of a reluctance or field coil excited design. In this configuration, the motor/generator 91 has a permanent magnet rotor 92 attached to the lower shaft 93. The rotor 92 is surrounded by a laminated stator 94 that provides energy conversion. Electrical connections 99 from the motor/generator 91 and magnetic bearings 75, 76, 776 and position sensors 83 exit the container 72 through a vacuum tight feed through 100 and connect with external cabling 101.

Figure 5:
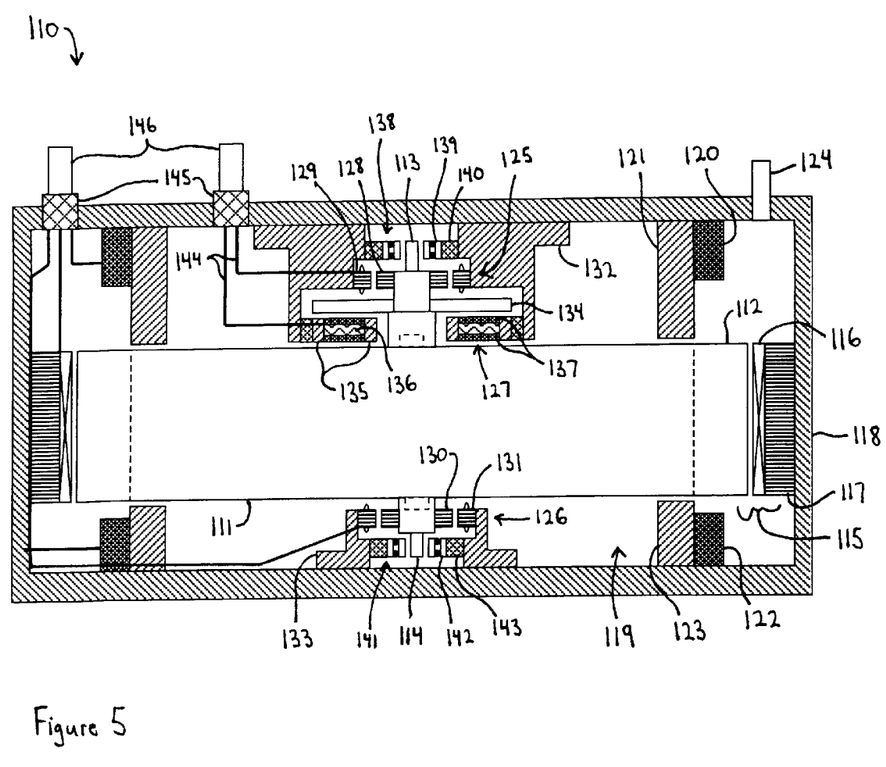
FIG. 5 is a schematic drawing of an alternate configuration flywheel energy storage device with five active axes magnetic bearing system in accordance with the invention.

An alternate configuration flywheel energy storage device with five active axes magnetic bearing system in accordance with the invention is shown in FIG. 5. This configuration shows different attributes from the previous configuration although each attribute is not intended to be specific to one configuration or the other. Likewise, different configurations of flywheel storage devices in accordance with the invention can be constructed. The flywheel system 110 is comprised of a solid steel flywheel 111 inside an enclosed container 118 having an internal vacuum 119. The flywheel 111 stores energy and also serves as an integral motor/generator. The flywheel 111 has a periphery with integral protrusions 112 or teeth that serve as motor/generator poles. Surrounding the protrusions 112 are stationary armature coils 116 and a laminated flux diffusion ring 117 that is attached to the inside of the steel container 118. Upper and lower field coils 120 and 122 drive magnetic flux into the axial faces of the flywheel 111 through pole pieces 121 and 123. The flux travels radially outward in the flywheel 111 and the rotating protrusions 112 induce AC voltages in the surrounding armature coils 116. The varying flux is then smoothed by the diffusion ring 117 and then completes the paths through the container 118. The current applied to the field coils 120, 122 is varied to control the induced voltages in the armature coils 116 at a given speed. Both coils can be varied independently but they can also be controlled in together such that the axial force exerted on the flywheel 111 does not change with filed coil flux generated. The flywheel 111 has upper and lower shafts 113 and 114 and is supported by an upper active radial magnetic bearing 125, lower active radial magnetic bearing 126 and an active axial magnetic bearing 127. The upper radial magnetic bearing 125 is comprised of a rotor portion 128 attached to the upper shaft 113 and a surrounding stator portion 129 that produces radial control forces. The lower radial magnetic bearing is comprised of a rotor portion 130 that is attached to the lower shaft 114 and a surrounding stator portion 131. The axial weight of the flywheel 111 is balanced by the active axial magnetic bearing 127. The axial magnetic bearing is comprised of two steel poles that act on both a thrust disk 134 attached to the upper shaft 113 and the upper face of the flywheel 111. A permanent magnet 136 provides bias flux and control coils 137 provide control currents. Other configurations of the active axial magnetic bearing could also be used so long as they provided sufficient support for the weight of the flywheel 111, were efficient and did not produce significantly high destabilizing tilt moments that would overpower the radial magnetic bearings 125, 126. The magnetic bearings are preferably homopolar for high efficiency and more preferably also permanent magnet biased. When the magnetic bearings 125, 126, 127 are overloaded or are not operating, the flywheel 111 is supported by upper and lower auxiliary bearings 138, 141. The auxiliary bearings 138, 141 are comprised of ball bearing sets 139, 142 that are mounted to upper and lower stators 132, 133 through use of spring dampers 140, 143. Electrical connections 144 from the magnetic bearings 125, 126, 127 and field coils 120, 122 and armature coils 116 exit the container 118 through vacuum tight feedthroughs 145 and attach to external cabling 146. A vacuum port 124 can be used to establish and or maintain the internal vacuum 119.

Figure 6:
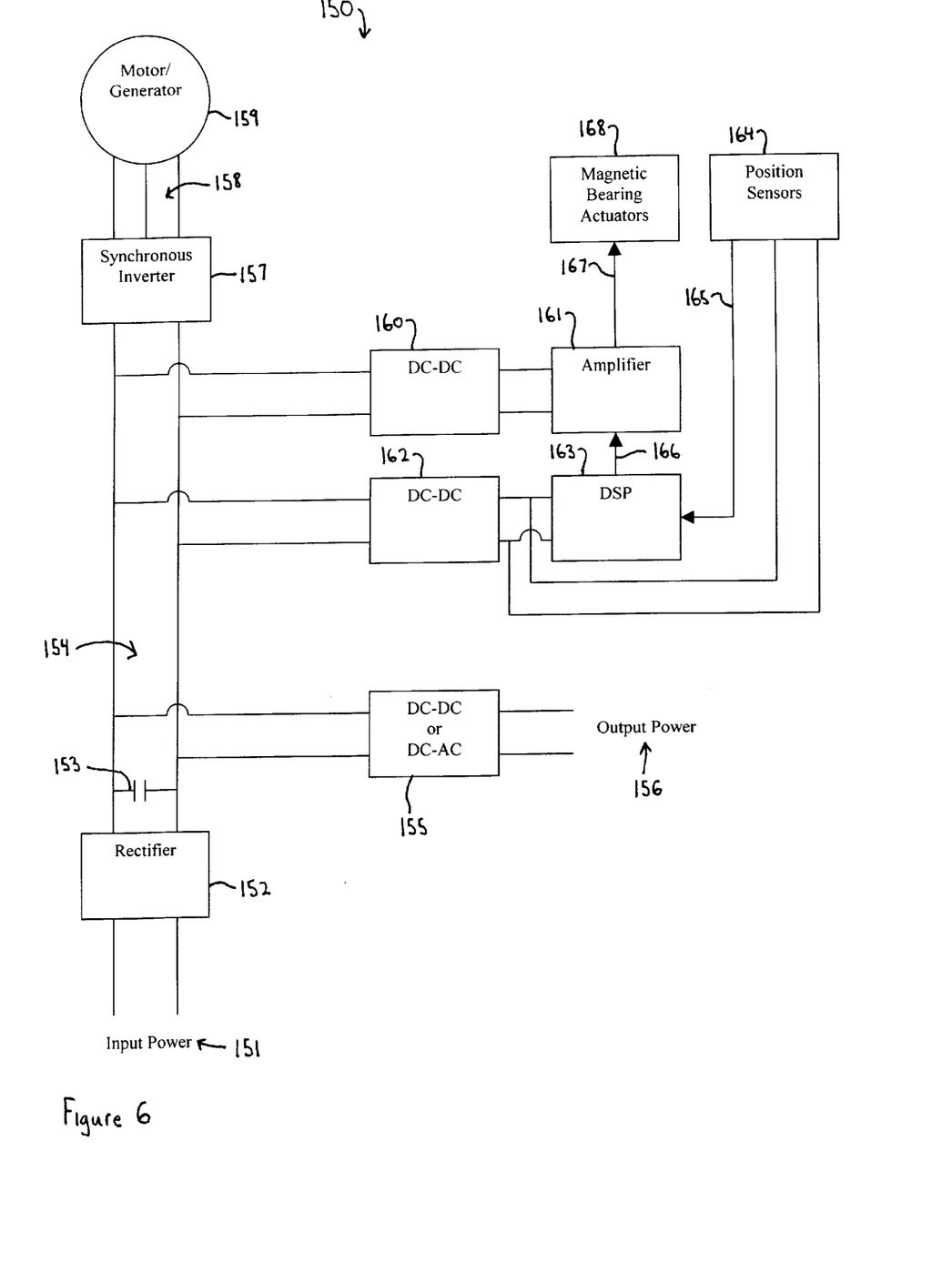
FIG. 6 is a schematic drawing of a power system for a flywheel energy storage device in accordance with the invention.

Flywheel energy storage devices can be electrically configured in numerous ways depending on the intended application. When employing a five active axes magnetic bearing system of the invention, the bearings require power to operate. Because the flywheel is intended to be rotating when power is not available such that the flywheels energy provides power, the flywheel generator must also provide power for the active magnetic bearing system. A power system for a flywheel energy storage device in accordance with the invention is shown in FIG. 6. The power system 150 takes a primary alternating current power input 151 and provides continuous power output 156 that can be AC or EDC. The input power 151 is rectified using a rectifier 152 and filtered with a capacitor 153 to a DC buss 154. An output DC-DC converter or DC-AC Inverter 155 is connected to the DC buss 154 and provides the output power 156. When the input power 151 is not available, output power 156 remains using energy from the flywheel motor/generator 159. A synchronous inverter 157 is connected to the DC buss 154. The inverter 157 converts the DC buss 154 to synchronous AC power 158 that drives the motor/generator 159. During an interruption of the primary power 151, the synchronous AC power 158 flows instantaneously backwards from the motor/generator 159 through the inverter 157. The synchronous AC 158 is rectified in the inverter 157 and supplied to the DC buss 154 to provide output power 156. Other configurations can also be made where the inverter 157 operates in fourth quadrant mode and thus regulates the voltage to the DC buss 154. Also connected to the DC buss are DC-DC converters 160, 162 that provide a constant voltage to power the amplifiers 161 and control digital signal processor, DSP, 163 for the magnetic bearing actuators 168. It is also possible to use an analog control instead of the DSP 163. Position sensors 164 powered from the DC-DC converter 162 provide position feed back 165 to the DSP 163. The DSP calculates the appropriate control signals 166 to maintain levitation and these signals are sent to the amplifiers 161 for amplification. The amplifiers 161 generate the control currents 167 that drive the magnetic bearing actuators 168. The use of permanent magnet biased magnetic bearing actuators are preferred because they reduce the required number of amplifiers to only five, one for each active axis. For self sensing magnetic bearings, the position sensors 164 would be eliminated and the actuators 168 would also serve to determine the flywheel position.

Obviously, numerous modifications and variations of the described preferred embodiment are possible and will occur to those skilled in the art in light of this disclosure of the invention. In some modifications and variations of the invention, not all of the many functions and advantages described for the preferred embodiments would be needed. Therefore, I contemplate the use of the invention using fewer than the complete set of noted functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims.

I claim:

1. A flywheel energy storage device for stationary applications comprising:

a solid alloy steel flywheel, free of a center through hole, supported for rotation about a vertical axis by a five active axes magnetic bearing system, said flywheel rotating in normal operation at a peripheral speed of at least 200 meters per second;

a brushless synchronous motor and generator operatively connected to said flywheel for accelerating and decelerating said flywheel for storing and retrieving energy;

a container surrounding said flywheel and maintained with an internal vacuum for reduction of aerodynamic drag on said flywheel;

said five active axes magnetic bearing system including one upper radial magnetic bearing, one lower radial magic bearing and at least one axial thrust magnetic bearing;

said one upper radial magnetic bearing and said one lower radial magnetic bearing each assembled in said flywheel device and at zero rotational speed having an operating radial load capacity-, R, measured in Newtons, and said flywheel having a mass, M measured in Kilograms, wherein $$0.170\, M < R < 0.838 M.$$

2. A flywheel energy storage device as described in claim 1 wherein:

said upper radial magnetic bearing and said lower radial magnetic bearing are homopolar.

3. A flywheel energy storage device as described in claim 2 wherein:

said upper radial magnetic bearing and said lower radial magnetic bearing are biased using permanent magnets.

4. A flywheel energy storage device as described in claim 2 wherein:

said upper radial magnetic bearing and said lower radial magnetic bearing are self sensing and do not require separate position sensors.

5. A flywheel enemy storage device for stationary applications comprising:

a solid alloy steel flywheel without a center through hole supported for rotation about a vertical axis by a five active axes magnetic bearing system, said flywheel rotating in normal operation at a peripheral speed of 200 meters per second or greater;

a brushless synchronous motor and generator means operatively connected to said flywheel for accelerating and decelerating said flywheel for storing and retrieving energy;

a container that surrounds said flywheel maintained with an internal vacuum for reduction of aerodynamic drag;

said five active axes magnetic bearing system comprising one upper radial magnetic bearing one lower radial magnetic bearing and at least one axial thrust magnetic bearing;

wherein said flywheel has no flexural resonance modes below its normal operating rotational speed and both said upper radial magnetic bearing and said lower radial magnetic bearing are controlled by a controller utilizing speed independent control.

6. A flywheel energy storage device as described in claim 5 wherein:

said upper radial magnetic bearing and said lower radial magnetic bearing are homopolar.

7. A flywheel energy storage device as described in claim 6 wherein:

said upper radial magnetic bearing and said lower radial magnetic bearing are biased using permanent magnets.

8. A flywheel energy storage device as described in claim 6 wherein:

said upper radial magnetic bearing and said lower radial magnetic bearing are self sensing and do not require separate position sensors.

9. A flywheel energy storage device for stationary applications comprising:

a solid alloy steel flywheel without a center through hole supported for rotation about a vertical axis by a five active axes magnetic bearing system, said flywheel rotating in normal operation at a peripheral speed of 200 meters per second or greater;

a brushless synchronous motor and generator means operatively connected to said flywheel for accelerating and decelerating said flywheel for storing and retrieving energy;

a container that surrounds said flywheel maintained with an internal vacuum for reduction of aerodynamic drag;

said five active axes magnetic bearing system comprising one upper radial magnetic bearing, one lower radial magnetic bearing and at least one axial thrust magnetic bearing;

said radial magnetic bearing located on the end of the flywheel opposite the end containing the axial thrust magnetic bearing, said radial magnetic bearing having a magnetically operative axial length-, X, in meters, while said flywheel has a body cylinder length-, L, in meters, and said flywheel rotates in normal operation with a peripheral speed-, V, in meters per second, wherein $$X \geq 9.25 \ 10^{-8} \ V^2 \ L.$$

10. A flywheel energy storage device as described in claim 9 wherein:

said upper radial magnetic bearing and said lower radial magnetic bearing are homopolar.

11. A flywheel energy storage device as described in claim 10 wherein:

said upper radial magnetic bearing and said lower radial magnetic bearing are biased using permanent magnets.

12. A flywheel energy storage device as described in claim 10 wherein:

said upper radial magnetic bearing and said lower radial magnetic bearing are self sensing and do not require separate position sensors.

13. A flywheel energy storage device for stationary applications comprising:

a solid alloy steel flywheel free of any center through hole, and supported for rotation about a vertical axis by a five active axes magnetic bearing system, said flywheel rotating in normal operation at a peripheral speed of 200 meters per second or greater;

a brushless synchronous motor and generator operatively connected to said flywheel for accelerating and decelerating said flywheel for storing and retrieving energy;

a container enclosing said flywheel and maintained with an internal vacuum for reduction of aerodynamic drag;

said five active axes magnetic bearing system comprising one upper radial magnetic bearing, one lower radial magnetic bearing and at least one homopolar axial thrust magnetic bearing.

14. A flywheel energy storage device as described in claim 13 wherein:

said upper radial magnetic bearing and said lower radial magnetic bearing are homopolar.

15. A flywheel energy storage device as described in claim 14 wherein:

said upper radial magnetic bearing and said lower radial magnetic bearing are biased using permanent magnets.

16. A flywheel energy storage device as described in claim 14 wherein:

said upper radial magnetic bearing and said lower radial magnetic bearing are self sensing and do not require separate position sensors.

17. A flywheel energy storage device as described in claim 13 wherein:

said one upper radial magnetic bearing, said one lower radial magnetic bearing and said at least one axial thrust magnetic bearing are controlled by at least five amplifiers and at least one controller all of which are powered by one or more DC-DC converters connected to the direct current side of a synchronous inverter driving said brushless synchronous motor and generator.

18. A flywheel energy storage device as described in claim 13 wherein:

said axial thrust bearing uses an axial surface of said steel flywheel as an integral element of said axial thrust bearing, wherein flux generated in said axial thrust bearing is conducted through high permeability portions of said steel flywheel in operation of said axial thrust bearing.

* * * * *